United States Patent
Hwang (10) Patent No.: US 9,995,077 B2
(45) Date of Patent: Jun. 12, 2018

(54) DOOR HOLDING APPARATUS AND REFRIGERATOR HAVING THE SAME

(71) Applicant: Samsung Electronics Co., Ltd., Suwon-si (KR)

(72) Inventor: Jun Kyu Hwang, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 163 days.

(21) Appl. No.: 14/803,518

(22) Filed: Jul. 20, 2015

(65) Prior Publication Data
US 2016/0040467 A1 Feb. 11, 2016

(30) Foreign Application Priority Data
Aug. 8, 2014 (KR) .................. 10-2014-0102378

(51) Int. Cl.
E05F 5/06 (2006.01)
F25D 23/02 (2006.01)
F16B 1/00 (2006.01)

(52) U.S. Cl.
CPC .............. *E05F 5/06* (2013.01); *F16B 1/00* (2013.01); *F25D 23/028* (2013.01); *F16B 2001/0035* (2013.01); *F25D 23/025* (2013.01); *F25D 2323/021* (2013.01); *F25D 2323/024* (2013.01)

(58) Field of Classification Search
CPC .. E05F 5/06; E05C 17/56; E05C 19/16; E05C 19/163; E05C 19/165; E05B 47/038; E05B 47/004; E05B 47/00; E05B 65/0042; E05B 65/005; E05Y 2201/46; F25D 2323/023; F25D 23/02; F25D 2323/024; F25D 23/028; F25D 2323/02; F25D 23/025; F25D 2323/023; F25D 23/04; F25D 2323/021; F16B 1/00; F16B 2001/0035
USPC ..... 312/405, 291–292; 16/82, 319–320, 365, 16/366, 371, 374; 49/168, 169, 171
See application file for complete search history.

(56) References Cited

U.S. PATENT DOCUMENTS

| | | | | |
|---|---|---|---|---|
| 1,927,398 A | * | 9/1933 | Glasser | F25D 23/04 292/DIG. 71 |
| 2,051,132 A | * | 8/1936 | Dart | F25D 23/04 126/340 |
| 2,150,064 A | * | 3/1939 | John | F25D 23/04 292/169 |

(Continued)

FOREIGN PATENT DOCUMENTS

KR 20120063316 A * 6/2012

*Primary Examiner* — Hiwot E Tefera
(74) *Attorney, Agent, or Firm* — Staas & Halsey LLP (57) ABSTRACT

A door holding apparatus fixed to an upper portion of a refrigerator uses magnetic force to hold a first door thereof and a second door thereof in an open state, wherein the refrigerator comprises a body, the first door provided with an opening, and the second door provided in the front of the first door to open and close the opening, the apparatus includes a first holder provided with a first magnet, a second holder provided with a second magnet, and a fixation unit fixed to an upper portion of the body and provided with a first fixation unit fixing the first door by magnetic force with the first magnet in a state where the first door is opened, and a second fixation unit fixing the second door by magnetic force with the second magnet in a state where the second door is opened.

19 Claims, 11 Drawing Sheets

(56) References Cited

U.S. PATENT DOCUMENTS

| | | | | |
|---|---|---|---|---|
| 3,258,285 | A * | 6/1966 | Smith | E05C 17/56 |
| | | | | 292/251.5 |
| 6,321,411 | B1 * | 11/2001 | Ikejiri | E05C 17/56 |
| | | | | 16/82 |
| 6,408,484 | B1 * | 6/2002 | Vandertouw | E05D 11/1028 |
| | | | | 16/320 |
| 8,382,169 | B2 * | 2/2013 | Bosshard | E05C 17/56 |
| | | | | 292/251.5 |
| 8,814,284 | B2 * | 8/2014 | Lee | F25D 23/025 |
| | | | | 312/291 |
| 8,839,561 | B2 * | 9/2014 | Yagi | E05D 1/06 |
| | | | | 16/320 |
| 9,625,204 | B2 * | 4/2017 | Kim | F25D 23/04 |
| 2009/0179539 | A1 * | 7/2009 | Henriksson | E05F 5/06 |
| | | | | 312/405 |
| 2014/0132144 | A1 * | 5/2014 | Kim | F25D 23/028 |
| | | | | 312/405 |
| 2014/0186236 | A1 | 7/2014 | Euting et al. | |
| 2014/0203695 | A1 * | 7/2014 | Oh | F25D 23/02 |
| | | | | 312/326 |
| 2014/0232251 | A1 * | 8/2014 | Kim | F25D 23/028 |
| | | | | 312/404 |

* cited by examiner

DOOR HOLDING APPARATUS AND REFRIGERATOR HAVING THE SAME

CROSS-REFERENCE TO RELATED APPLICATIONS

This application claims the priority benefit of Korean Patent Application No. 10-2014-0102378, filed on Aug. 8, 2014 in the Korean Intellectual Property Office, the disclosure of which is incorporated herein by reference.

BACKGROUND

1. Field

The following description relates to an apparatus for fixing a door to allow a refrigerator door having a double door structure to be fixed in an open state.

2. Description of the Related Art

In general, a refrigerator is an apparatus configured to keep foods fresh by having a body and a storage compartment provided in the body in a way that the front surface thereof is openable, and a cool air supplying apparatus supplying cool air into the storage compartment.

A temperature of the storage compartment may be kept in a predetermined range required to keep foods fresh.

The storage compartment of the refrigerator is provided in a way the front surface thereof is openable, and an openable front surface may be closed by a door to maintain a predetermined temperature of the storage compartment.

The storage compartment may be divided into an upper portion and a lower portion by a partition. Refrigerating compartment doors configured to open and close a refrigerating compartment provided in the upper portion may be side-by-side doors rotatably coupled to the body, and a freezing compartment door configured to open and close a freezing compartment provided in the lower portion may be a drawer type door movable back and forth in a sliding manner.

The refrigerating door may be provided in a pair, and any one of the refrigerating door may have a double door structure.

A refrigerating door having a double door structure may be provided to be rotatable in the front surface of the body, and may include a first door having an opening and a second door provided to be rotatable in the front of the first door to open and close the opening.

In a case of exhibiting a refrigerator, a door of the refrigerator may be opened to expose a storage compartment inside of the refrigerator to the outside so that the effect of the exhibition may be maximized.

In order to exhibit the refrigerator in a way that the door thereof is opened, an apparatus for fixing the opened refrigerator door may be needed.

Particularly, when the refrigerator door has a double door structure, a first door and a second door may be opened to be exhibited so that the effect of the exhibition may be further maximized.

In a case the exhibition of a refrigerator, the refrigerator may be delivered to an exhibition place, and then an apparatus for fixing refrigerator door may be installed in the refrigerator. Therefore, the apparatus for fixing refrigerator door may have a simple structure for the convenience of installation.

In addition, because there may be a limitation in the exhibition space, the apparatus for fixing the refrigerator door may be provided to occupy a small space.

SUMMARY

Therefore, it is an aspect of the present disclosure to provide an apparatus for fixing a door fixed to an upper portion of a refrigerator so that the refrigerator door is kept in an open state, and using a magnetic force to fix the refrigerator door.

Additional aspects of the present disclosure will be set forth in part in the description which follows and, in part, will be obvious from the description, or may be learned by practice of the disclosure.

In accordance with an aspect of the present disclosure an apparatus for a refrigerator to keep a first door thereof and a second door thereof in an open state, wherein the refrigerator comprises a body, the first door provided to be rotatable in the front of the body and provided with an opening, and the second door provided to be rotatable in the front of the first door to open and close the opening, the apparatus includes a first holder fixed to an upper portion of the first door and provided with a first magnet, a second holder fixed to an upper portion of the second door and provided with a second magnet and a fixation unit fixed to an upper portion of the body and provided with a first fixation unit fixing the first door by magnetic force with the first magnet in a state where the first door is opened, and a second fixation unit fixing the second door by magnetic force with the second magnet in a state where the second door is opened.

The fixation unit may include a bonding unit bonded to the upper portion of the body, and a fixation plate protruding from a front surface of the bonding unit toward a front surface of the body, wherein the first fixation unit and the second fixation unit may be provided in the fixation plate.

The first magnet and the second magnet may be provided to be moved in upward and downward directions in the first holder and the second holder, respectively.

The first fixation unit may be formed by a steel plate having a magnetic force, and in a state where the first door is opened, the first fixation unit may be placed a location corresponding to the first magnet.

When the first door is opened, and the first holder is moved so that the first magnet corresponds to the first fixation unit, the first magnet may be moved upward by magnetic force with the first fixation unit so that the first door may be fixed by the first fixation unit.

When the first magnet is away from a location corresponding to the first fixation unit because the first door is rotated by an external force, the first magnet may be moved downward to allow the first door to be easily rotated.

When the second door is opened, the first fixation unit may be placed in a location away from a moving path of the second magnet.

The second fixation unit may be formed by a steel plate having a magnetic force, and in a state where the second door is opened, the second fixation unit may be placed in a location corresponding to the second magnet.

When the second door is opened, and the second holder is moved so that the second magnet corresponds to the second fixation unit, the second magnet may be moved upward by magnetic force with the second fixation unit so that the second door may be fixed by the second fixation unit.

When the second magnet is away from a location corresponding to the second fixation unit because the second door is rotated by an external force, the second magnet may be moved downward to allow the second door to be easily rotated.

When the first door is opened, the second fixation unit may be placed in a location away from a moving path of the first magnet.

A stopper may be provided in the fixation plate to limit a rotation angle of the second door so that the second door may be prevented from being opened over a 90 degree angle.

In accordance with an aspect of the present disclosure a refrigerator includes a body, a first door provided to be rotatable in the front of the body and provided with an opening, a second door provided to be rotatable in the front of the first door to open and close the opening, a fixation unit fixed to the upper portion of the body and provided with a first fixation unit fixing the first door to be kept in an open state, and a second fixation unit fixing the second door to be kept in an open state, a first holder fixed to an upper portion of the first door and configured to fix the first door by being fixed to the first fixation unit when the first door is opened at a predetermined angle, and a second holder fixed to an upper portion of the second door and configured to fix the second door by being fixed to the second fixation unit when the second door is opened at a predetermined angle.

The fixation unit may include a bonding unit bonded to the upper portion of the body, and a fixation plate protruding from a front surface of the bonding unit toward a front surface of the body, wherein the first fixation unit and the second fixation unit may be provided in the fixation plate.

The first fixation unit and the second fixation unit may be formed by a steel plate having a magnetic force, and a first magnet and a second magnet provided to be moved in upward and downward directions may be provided in the first holder and the second holder.

When the first door is opened, and the first holder is moved so that the first magnet corresponds to the first fixation unit, the first magnet may be moved upward by a magnetic force with the first fixation unit so that the first door may be fixed by the first fixation unit.

When the first magnet is away from a location corresponding to the first fixation unit because the first door is rotated by an external force, the first magnet may be moved downward to allow the first door to be easily rotated.

When the second door is opened, and the second holder is moved so that the second magnet corresponds to the second fixation unit, the second magnet may be moved upward by magnetic force with the second fixation unit so that the second door may be fixed by the second fixation unit.

When the second magnet is away from a location corresponding to the second fixation unit because the second door is rotated by an external force, the second magnet may be moved downward to allow the second door to be easily rotated.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Reference will now be made in detail to embodiments of the present disclosure, examples of which are illustrated in the accompanying drawings, wherein like reference numerals refer to like elements throughout. The embodiments are described below to explain the present disclosure by referring to the figures.

Terms used in the description below, a front surface and a rear surface may represent a front surface side of a body 10 of a refrigerator and a rear surface side of a body 10 of a refrigerator, respectively. An upper portion and a lower portion may represent an upper portion side of a body 10 of a refrigerator and a lower portion side of a body 10 of a refrigerator, respectively.

Figure 1:
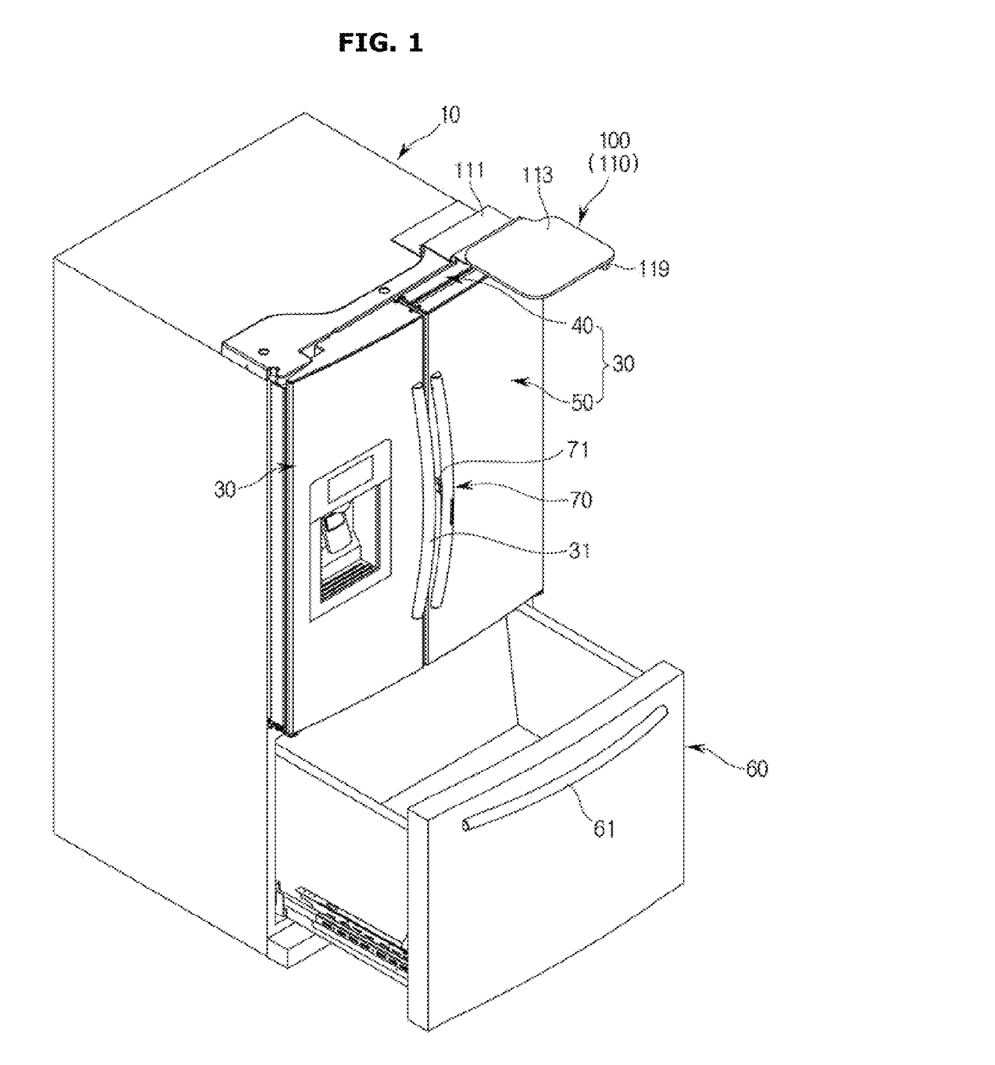
FIG. 1 illustrates a refrigerator in accordance with an embodiment of the present disclosure.
Figure 2:
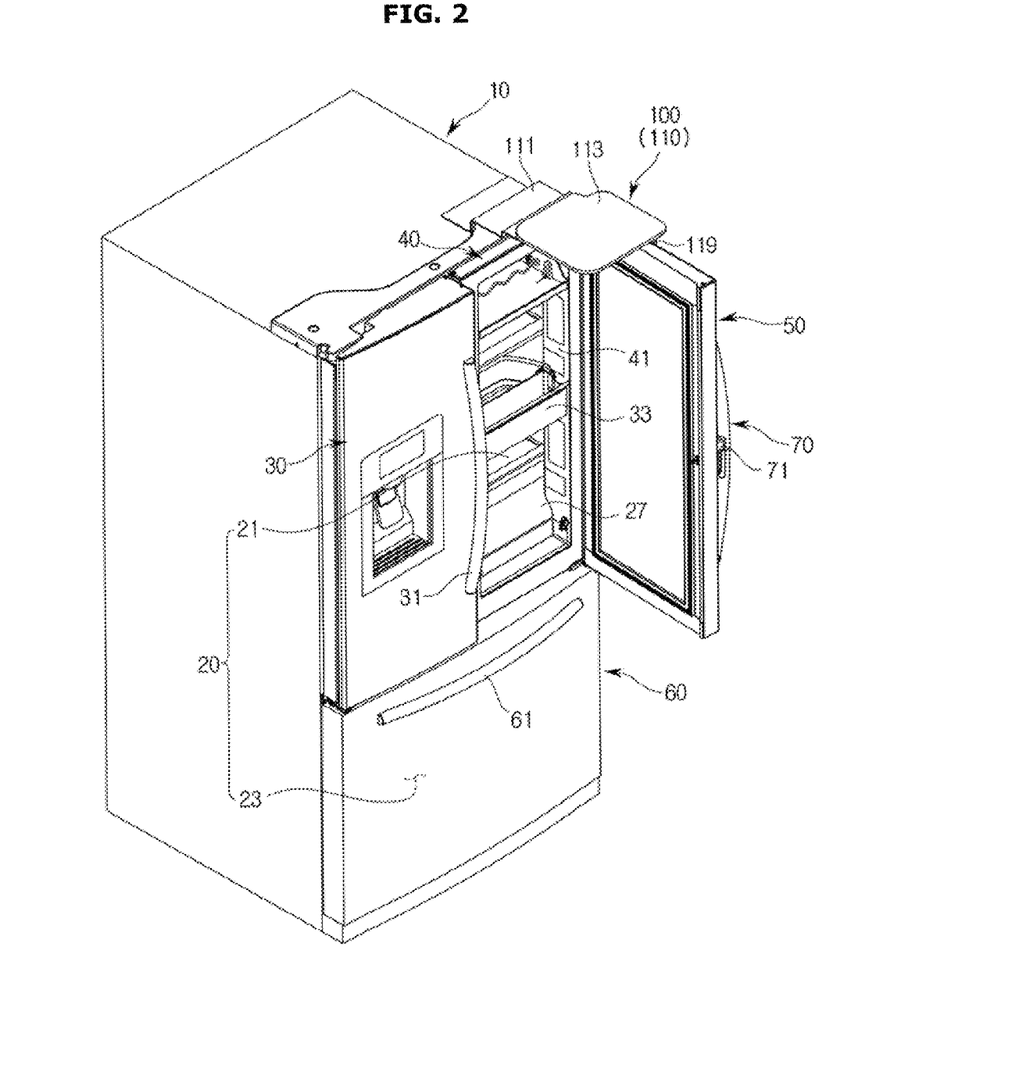
FIG. 2 illustrates a view in which a second door of the refrigerator of FIG. 1 is opened.
Figure 3:
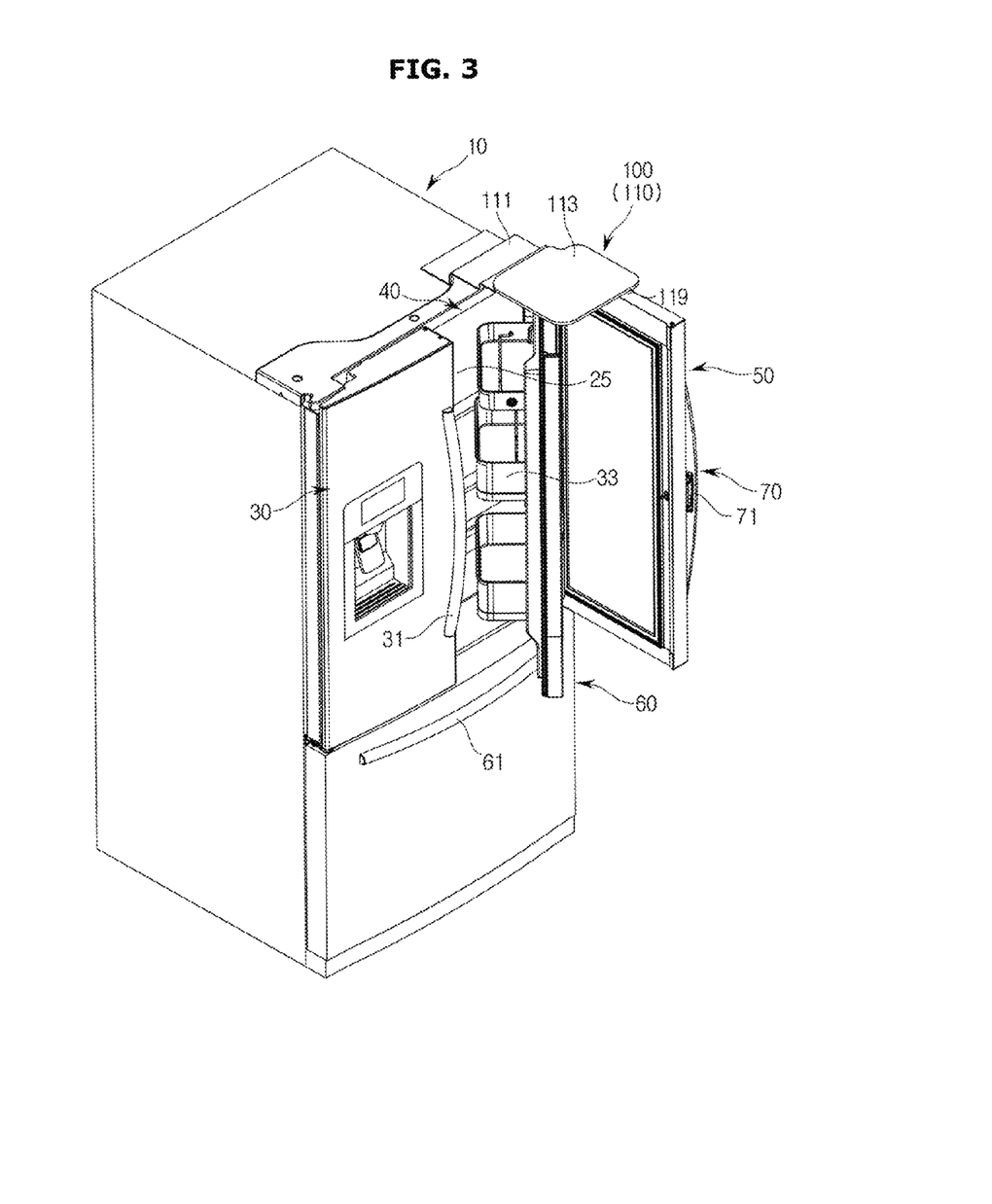
FIG. 3 illustrates a view in which a first door and a second door of the refrigerator of FIG. 1 are opened.

As illustrated in FIGS. 1 to 3, a refrigerator includes a body 10 forming an exterior of the refrigerator, a storage compartment 20 provided inside the body in a way that the front surface thereof is openable, and doors 30 and 60 opening/closing the storage compartment.

The body 10 includes an inner case (not shown) forming the storage compartment 20, an outer case (not shown) forming the external appearance, and a cool air supplying apparatus (not shown) supplying cool air into the storage compartment 20.

The cool air supplying apparatus may include a compressor, a condenser, an expansion valve, an evaporator, and a blowing fan, and a cool air duct. Between the inner case and the outer case, thermal insulation material (not shown) is filled to prevent cold air in the storage compartment 20 from escaping.

At a lower portion of the rear of the body 10, a machinery room (not shown) is provided to install a compressor to compress refrigerant, and a condenser to condense the compressed refrigerant.

The storage compartment 20 is divided into an upper portion and a lower portion by a partition (not shown). A refrigerating compartment 21 is provided in the upper portion of the storage compartment 20 and a freezing compartment 23 is provided in the lower portion of the storage compartment 20.

In the refrigerating compartment 21, a plurality of racks 25 are provided so that the refrigerating compartment 21 is divided into a plurality of spaces, and a plurality of storage boxes 27 may be provided to store foods.

The refrigerating compartment 21 is opened/and closed by a pair of refrigerating compartment doors 30 rotatably coupled to the body 10, and the freezing compartment door 23 is opened and closed by a freezing compartment door 60 moved back and forth in a sliding manner.

Handles 31 and 61 are respectively provided in the refrigerating compartment door 30 and the freezing compartment door 60 so that a user opens/closes the refrigerating compartment door 30 and the freezing compartment door by pulling on the respective handle.

In the refrigerating compartment doors 30 provided in a pair, a refrigerating compartment door 30 disposed on the right side in the drawing may have a double door structure.

The right refrigerating compartment door 30 having a double door structure includes a first door 40 provided in the front of the body 10 to be rotatable and configured to open and close the refrigerating compartment 21, and a second door 50 provided in the front of the first door 40 to be rotatable and rotated in the same direction as the first door 40.

An opening 41 is provided in the first door 40, and a plurality of door guides 33 are provided in the openings.

The opening 41 provided in the first door 40 is opened and closed by the second door 50 that is provided in the front of the first door 40.

A handle 70, to which a latch unit 71 is coupled, may be provided in the second door 50 so that the first door 40 and the second door 50 may be selectively opened and closed.

The handle 70 is coupled to the front of the second door 50, and the latch unit 71 is coupled to the rear surface of the handle 70. Therefore, the second door 50 may be fixed or unfixed to (coupled to or uncoupled from) the first door 40.

The latch unit 71 may pass through the second door 50 and then be locked and fixed to the first door 40. Because the latch unit 71 is locked or unlocked to the first door 40 by a manipulation of a user, a user may hold the handle 70 to open and close only the second door 50 or to open and close the first door 40 and the second door 50 at the same time.

When exhibiting the refrigerator, the doors 30 and 60 of the refrigerator are opened to expose the inside of the storage compartment 20 so that the effect of the exhibition may be maximized. Particularly, the right refrigerating compartment door 30 having a double door structure is exhibited in a way that the first door 40 and the second door 50 thereof are opened.

As illustrated in FIGS. 1 to 4, a door fixing, or holding, apparatus 100 configured to keep the first door 40 and the second door 50 in an open state is attached to the refrigerator to exhibit the refrigerator with the first door 40 and the second door 50 in an open state.

The rotary motion of the first door 40 and the second door 50 may be guided by an upper hinge that is coupled to an upper portion of the first door 40 and the second door 50. A cam is provided in a lower hinge that is coupled to a lower portion of the first door 40 and the second door 50 so that the first door 40 and the second door 50 may be closed in an open angle that is below a predetermined angle, or may be opened in an open angle that is over a predetermined angle.

Figure 4:
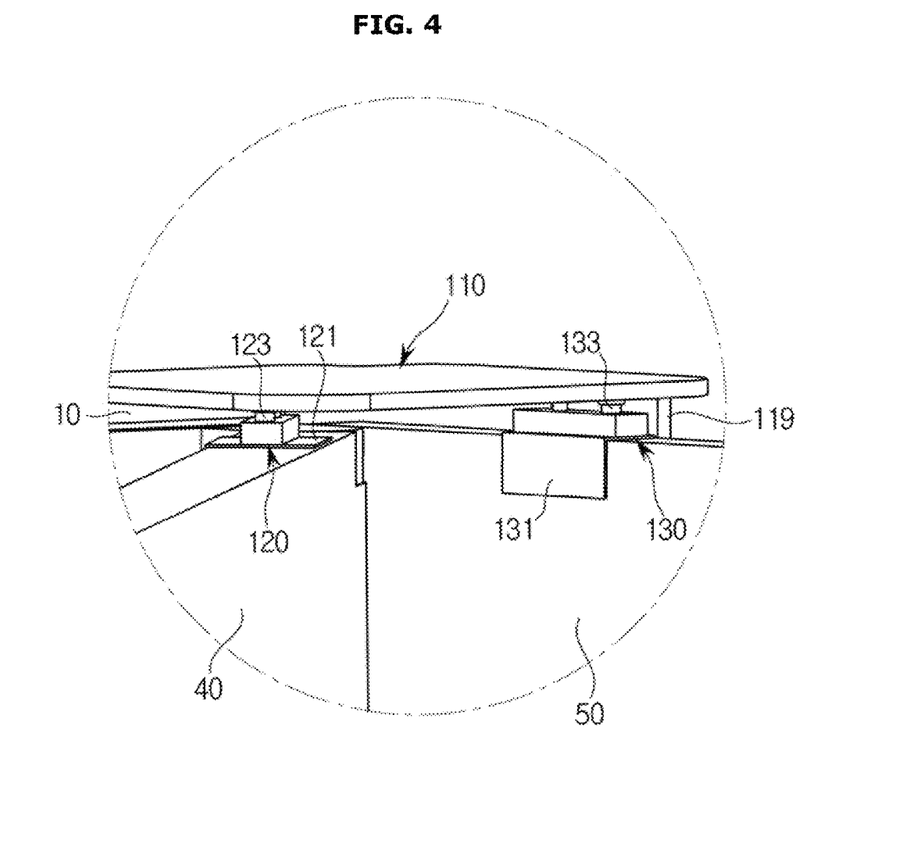
FIG. 4 illustrates a view in which a fixing apparatus is fixed to a refrigerator in accordance with an embodiment of the present disclosure.

Therefore, the door fixing apparatus 100 is mounted to the upper portion of the body 10, the first door 40 and the second door 50 so that the first door 40 and the second door 50 are kept in an open state.

Because the door fixing apparatus 100 is mounted to the upper portion of the body 10, the first door 40, and the second door 50, the spatial constraints of the exhibition hall in which the refrigerator is displayed may be minimized.

The door fixing apparatus 100 includes a fixation unit 110 fixed to the upper portion of the body 10 to fix the first door 40 and the second door 50 to be kept in an open state, a first holder 120 fixed to an upper portion of the first door 40 to fix the first door 40 to the fixation unit 110, and a second holder 130 fixed to an upper portion of the second door 50 to fix the second door 50 to the fixation unit 110.

As illustrated in FIGS. 4 to 7, the fixation unit 110 includes a bonding unit 111 bonded to the upper portion of the body 10, and a fixation plate 113 provided to protrude toward the front of the body 10 from the front of the bonding unit 111.

The bonding unit 111 is bonded to the upper portion of the body 10 using an adhesive, such as double-sided adhesive tape so that the fixation unit 110 is fixed to the body 10.

Figure 5:
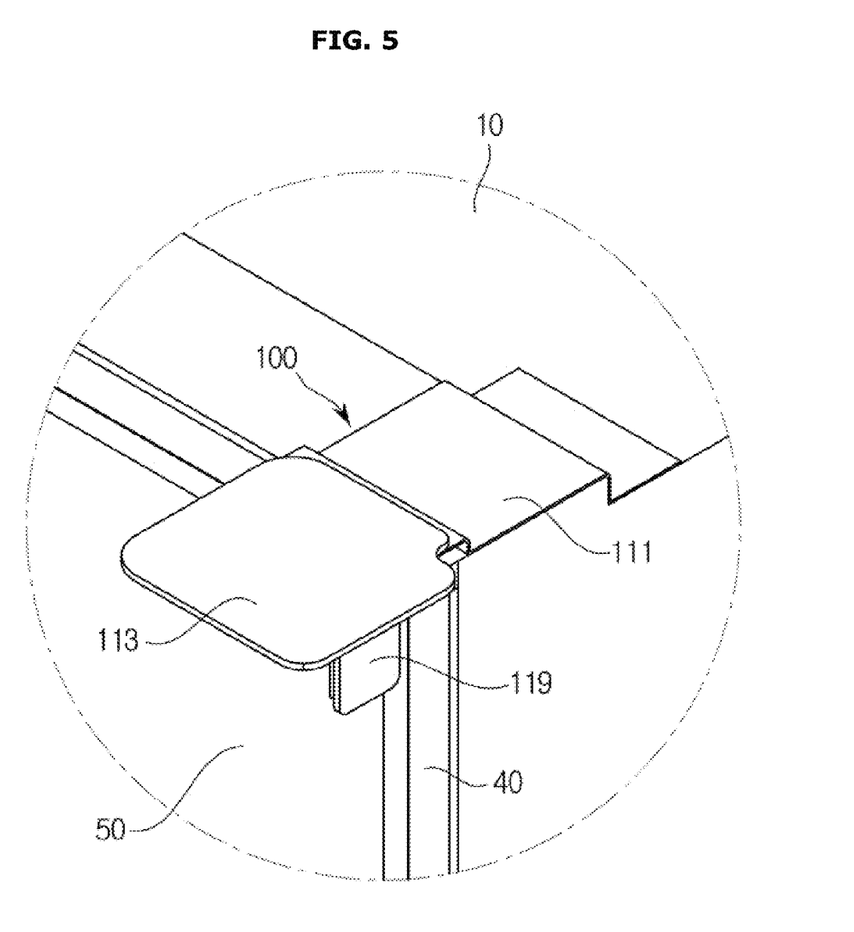
FIG. 5 illustrates a view seen from above of a fixation unit mounted to a refrigerator in accordance with an embodiment of the present disclosure.
Figure 6:
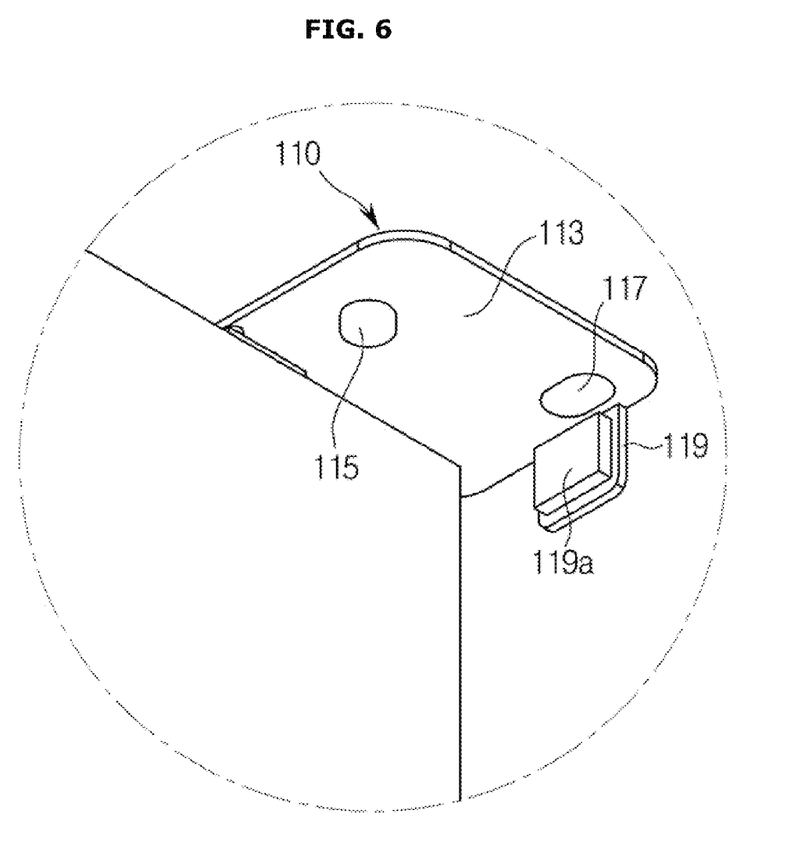
FIG. 6 illustrates a view seen from below of a fixation unit installed in a refrigerator in accordance with an embodiment of the present disclosure.

A lower surface of the fixation plate 113 may be formed by a steel plate, and a first fixation unit 115 and a second fixation unit 117 may be provided on the lower surface of the fixation plate 113 to fix the first door 40 and the second door 50.

In the drawings, two of the fixation units 115 and 117, which are provided on the lower surface of the fixation plate 113 to fix the first door 40 and the second door 50, are illustrated, but the disclosure is not limited thereto and any number of fixation units may be provided.

The first fixation unit 115 and the second fixation unit 117 may be formed by a steel plate having a magnetic force. The first fixation unit 115 may be placed in a location corresponding to a first magnet 123 provided in the first holder 120 in a case when the first door 40 is opened. The second fixation unit 117 may be placed in a location corresponding to a second magnet 133 provided in the second holder 130 in a case when the second door 50 is opened.

Because the first fixation unit 115 and the second fixation unit 117 are formed by a steel plate having a magnetic force, when the first door 40 is opened and the first magnet 123 is placed in a location corresponding to the first fixation unit 115, the first door 40 may be fixed while being kept in an open state by the magnetic force of the first fixation unit 115 and the first magnet 123, and when the second door 50 is opened and the second magnet 133 is placed in a location corresponding to the second fixation unit 117, the second door 50 may be fixed while being kept in an open state by the magnetic force of the second fixation unit 117 and the second magnet 133.

Because only the fixation unit 115 and 117 are provided to have the magnetic force although the lower surface of the fixation plate 113 is formed by a steel plate, the first magnet 123 and the second magnet 133 are affected by magnetic force only when placed in a location corresponding to the first fixation unit 115 and the second fixation unit 117, otherwise the first magnet 123 and the second magnet 133 are not affected by magnetic force.

Hereinafter a detailed description of a motion in which the first door 40 and the second door 50 are fixed by the fixation unit 110 will be described.

Figure 7:
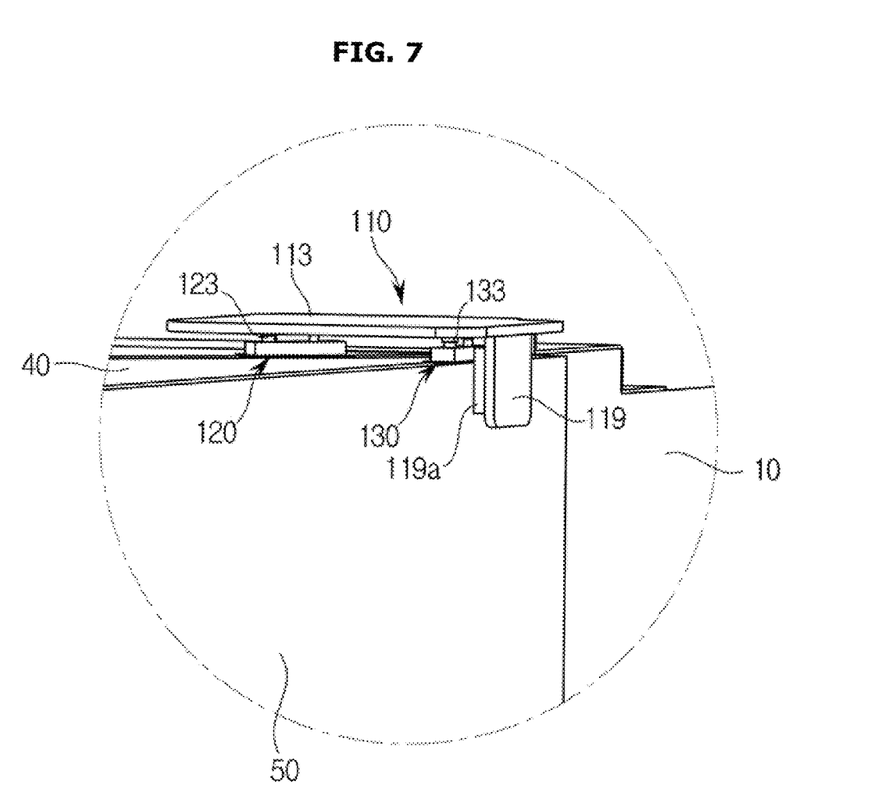
FIG. 7 illustrates a view in which an opening angle of a second door of a refrigerator is limited by a stopper in accordance with an embodiment of the present disclosure.

A stopper 119 may be provided in the right side of the fixation plate 113 to limit a rotation angle of the second door 50 when the second door 50 is opened.

When the second door 50 is opened, particularly, the second door 50 is opened at a 90 degree angle, the second door 50 may have contact with the stopper 119. Therefore, the second door 50 may be prevented from being opened more than a 90 degree angle, and thus the spatial constraints of the exhibition hall in which the refrigerator is displayed may be minimized.

On a surface making a contact with the second door 50, a buffer member 119a, such as rubber material, for example, may be provided to prevent the second door 50 from being damaged (refer to FIGS. 5 and 6).

As illustrated in FIG. 4, a first holder fixation unit 121 mounted to the upper portion of the first door 40, and the first magnet 123 moved back and forth are provided in the first holder 120.

The first holder fixation unit 121 is bonded to the upper portion of the first door 40 using an adhesive, such as double-sided adhesive tape, for example, so that the first holder 120 is fixed to the first door 40.

The first magnet 123 is provided to be moved up and down on the upper portion of the first holder 120, particularly moved up and down by the first fixation unit 115 of the fixation unit 110, and a detailed description thereof will be provided later.

As the first holder 120, the second holder fixation unit 131 mounted to the upper portion of the second door 50 and the second magnet 133 moved up and down are provided in the second holder 130.

The second holder fixation 131 is attached to the upper portion of the second door 50 by an adhesive, such as double-sided adhesive tape, for example, so that the second holder 130 is fixed to the second door 50.

The second magnet 133 may be provided to be moved up and down on the upper portion of the second holder 130, particularly moved up and down by the second fixation unit 117 of the fixation unit 110, and a detailed description thereof will be provided later.

Figure 8:
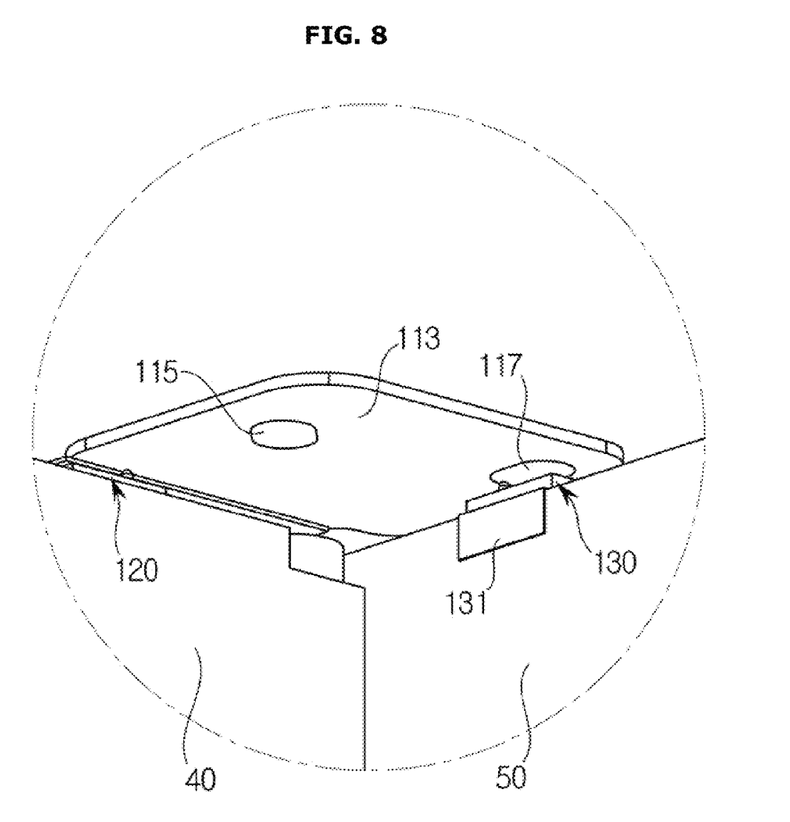
FIG. 8 illustrates a view in which a second door of a refrigerator is opened and a second magnet is disposed to correspond to a second fixation unit in accordance with an embodiment of the present disclosure.
Figure 9:
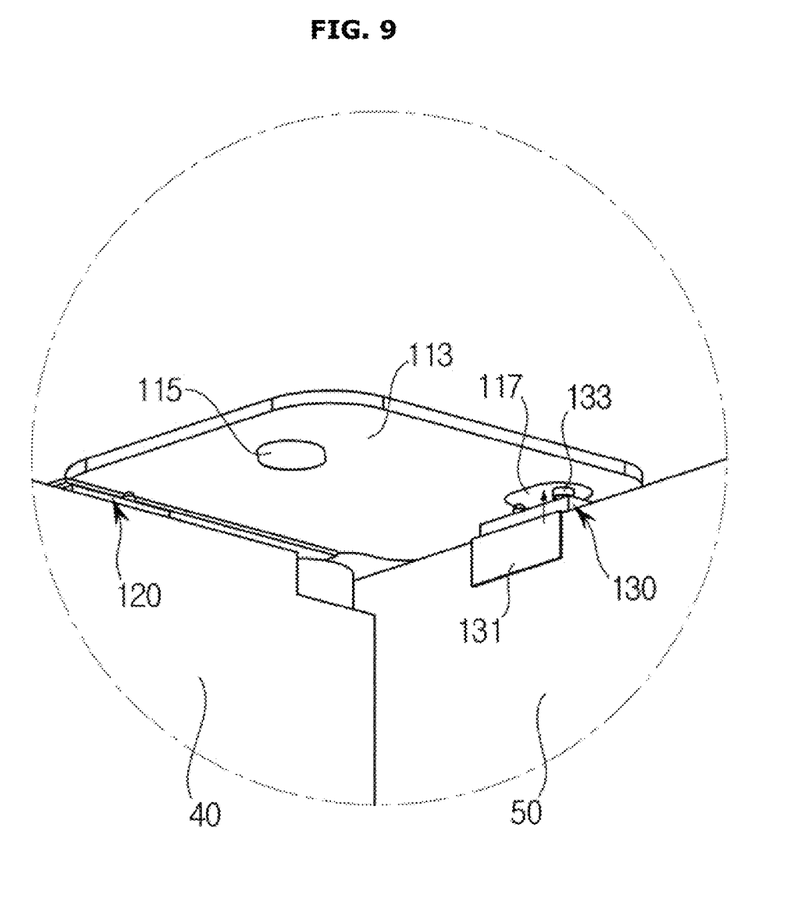
FIG. 9 illustrates a view in which a second magnet is moved upward by a magnetic force and attached to a second fixation unit in FIG. 8.

As illustrated in FIGS. 2 and 8, as for the second door 50, when the second door 50 is opened at a predetermined angle, the second magnet 133 of the second holder 130 may be moved to a location corresponding to the second fixation unit 117 of the fixation unit 110, moved upward by magnetic force between the second fixation unit 117 formed by a magnet and the second magnet 133, and then attached to the second fixation unit 117, as illustrated in FIG. 9.

When the second magnet 133 is attached to the second fixation unit 117, the second door 50 may be fixed while being kept in an open state, and may be prevented from being opened over a 90 degree angle by the stopper 119.

In a case when the second door 50 is in a fixed state because the second magnet 133 is attached to the second fixation unit 117, and when the second door 50 is opened by an external force, the second magnet 133 may be away from the location corresponding to the second fixation unit 117, and the second magnet 133 may be moved downward because the second magnet 133 is not affected by magnetic force so that the second door 50 may be easily rotated.

When the second door 50 is opened, the second door 50 may be rotated regardless of the first fixation unit 115 because the first fixation unit 115 is provided in a location away from a moving path of the second magnet 133.

In addition, when the first door 40 is opened, the first door 40 may be rotated regardless of the second fixation unit 117 because the second fixation unit 117 is provided in a location away from a moving path of the first magnet 123.

Figure 10:
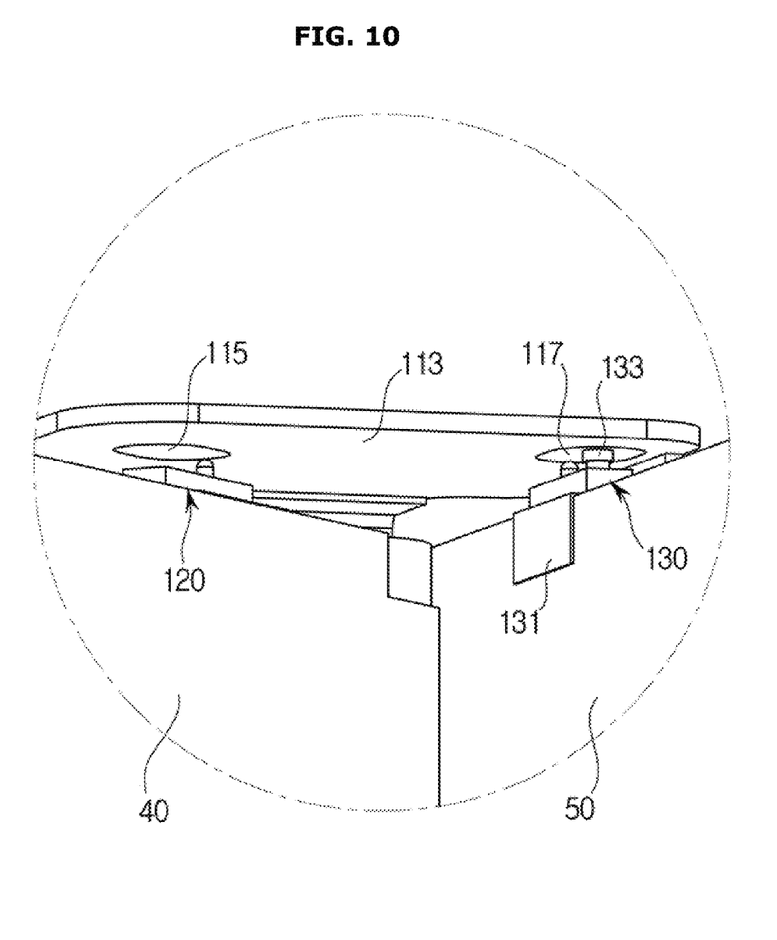
FIG. 10 illustrates a view in which when a first door and a second door are opened, a first magnet and a second magnet are placed in a location corresponding to a first fixation unit and a second fixation unit, respectively.

As illustrated in FIGS. 3 and 10, when the first door and the second door 50 are opened at the same time, the second magnet 133 may be moved to a location corresponding to the second fixation unit 117, and the second magnet 133 may be moved upward by magnetic force between the second fixation unit 117 formed by a magnet and the second magnet 133. Accordingly, the second magnet 133 may be attached to the second fixation unit 117, as in the case of when only the second door 50 is opened.

Figure 11:
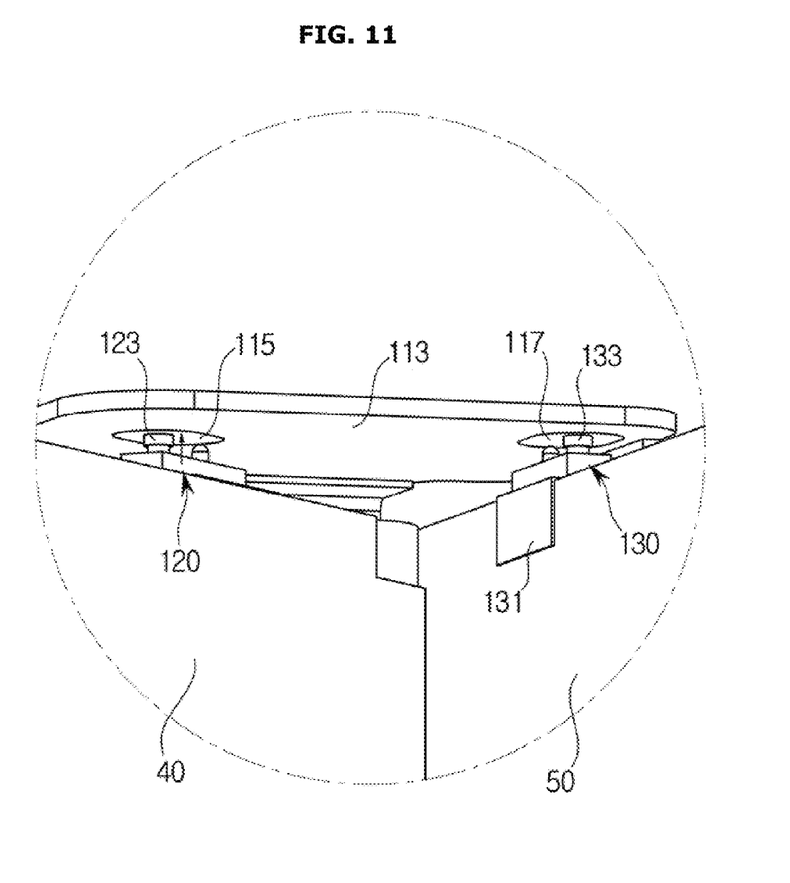
FIG. 11 illustrates a view in which a first magnet and a second magnet are moved upward by a magnetic force and attached to a first fixation unit and a second fixation unit, respectively in FIG. 8.

In a case when the second door 50 is fixed while being kept in an open state by the second magnet 133 being attached to the second fixation unit 117, and when the first door 40 is opened at a predetermined angle, and then the first magnet 123 is moved to a location corresponding to the first fixation unit 115 of the fixation unit 110, as illustrated in FIG. 11, the first magnet 123 may be moved upward by a magnetic force between the first fixation unit 115 formed by a magnet and the first magnet 123, and then attached to the first fixation unit 115.

When the first magnet 123 and the second magnet 133 are attached to the first fixation unit 115 and the second fixation unit 117, respectively, the first door 40 and the second door 50 may be fixed while being kept in an open state.

In a case when the first door 40 is in a fixed state because the first magnet 123 is attached to the first fixation unit 115, and when the first door 40 is opened by an external force, the first magnet 123 may be away from the location corresponding to the first fixation unit 115, and the first magnet 123 may be moved downward because the first magnet 123 is not affected by magnetic force so that the first door 40 may be easily rotated.

In a case when the second door 50 is in a fixed state because the second magnet 133 is attached to the second fixation unit 117, and when the second door 50 is opened by an external force, the second magnet 133 may be away from the location corresponding to the second fixation unit 117, and the second magnet 133 may be moved downward because the second magnet 133 is not affected by magnetic force so that the second door 50 may be easily rotated.

As is apparent from the above description, according to the proposed apparatus and the refrigerator having the same, the spatial constraints of the exhibition hall in which the refrigerator is displayed may be minimized because the door fixing apparatus has a simple structure using a magnetic force, and the door fixing apparatus is fixed to an upper portion of the refrigerator.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A door holding apparatus for a refrigerator to hold a first door thereof and a second door thereof in an open state, wherein the refrigerator comprises a body, the first door provided to be rotatable around a point of rotation in a front of the body and provided with an opening, and the second door provided to be rotatable in a front of the first door to open or close the opening, the door holding apparatus comprising:
   a first holder coupleable to and detachable from the first door and including a first magnet;
   a second holder coupleable to and detachable from the second door and including a second magnet; and
   a fixation unit coupleable to and detachable from the body, the fixation unit including:
      a first fixation unit placed at a first distance from the point of rotation, to selectively fix the first door open at a first angle by selectively holding the first holder using the first magnet while the fixation unit is coupled to the body and the first holder is coupled to the first door, and a second fixation unit placed at a second distance other than the first distance from the point of rotation, to selectively fix the second door open at a second angle different from the first angle by selectively holding the second holder using the second magnet while the fixation unit is coupled to the body, the first fixation unit is selectively fixing the first door open at the first angle and the second holder is coupled to the second door.

2. The door holding apparatus of claim 1, wherein, the fixation unit further includes:
a bonding unit configured to be selectively bonded to an upper portion of the body, to thereby couple the fixation unit to the body, and
a fixation plate protruding from the bonding unit and from a front surface of the body, to provide the first fixation unit and the second fixation uniton the fixation plate to selectively hold the first holder coupled to the first door and the second holder coupled to the second door.

3. The door holding apparatus of claim 2, wherein, the first magnet is provided to be moved in upward and downward directions in the first holder, to allow the first fixation unit to selectively hold the first holder, and the second magnet is provided to be moved in upward and downward directions in the second holder, to allow the second fixation unit selectively hold the second holder.

4. The door holding apparatus of claim 3, wherein, the first fixation unit is formed by a steel plate, and is placeable in a location corresponding to the first magnet, to thereby selectively hold the first holder with the moving first magnet.

5. The door holding apparatus of claim 4, wherein, when the first door is opened, and when the first holder is moved so that the first magnet is placed in a location corresponding to the first fixation unit, the first magnet is moved upward by magnetic force interacting with the first fixation unit so that the first fixation unit holds the first holder with the first magnet moved upward, thereby fixing the first door.

6. The door holding apparatus of claim 5, wherein, when the first magnet is away from the location corresponding to the first fixation unit, the first magnet is moved downward to allow the first door to be easily rotated.

7. The door holding apparatus of claim 6, wherein, when the second door is opened, the first fixation unit is placed in a location away from a moving path of the second magnet.

8. The door holding apparatus of claim 3, wherein, the second fixation unit is formed by a steel plate, and is placeable in a location corresponding to the second magnet, to thereby selectively hold the second holder with the moving second magnet.

9. The door holding apparatus of claim 8, wherein, when the second door is opened, and when the second holder is moved so that the second magnet is placed in a location corresponding to the second fixation unit, the second magnet is moved upward by magnetic force interacting with the second fixation unit so that the second fixation unit holds the second holder with the second magnet moved upward, thereby fixing the second door.

10. The door holding apparatus of claim 9, wherein, when the second magnet is away from the location corresponding to the second fixation unit, the second magnet is moved downward to allow the second door to be easily rotated.

11. The door holding apparatus of claim 10, wherein, when the first door is opened, the second fixation unit is placed in a location away from a moving path of the first magnet.

12. The door holding apparatus of claim 2, wherein, a stopper is provided in the fixation plate to limit a rotation angle of the second door so that the second door is prevented from being rotated open at more than a 90 degree angle.

13. A refrigerator comprising:
a body;
a first door provided to be rotatable around a point of rotation in a front of the body and provided with an opening;
a second door provided to be rotatable in a front of the first door to open or close the opening;
a first holder coupleable to and detachable from the first door;
a second holder coupleable to and detachable from the second door; and
a fixation unit coupleable to and detachable from the body, the fixation unit including:
a first fixation unit placed at a first distance from the point of rotation, to selectively fix the first door rotated open at a first angle by selectively holding the first holder coupled to the first door while the fixation unit couples to the body and the first holder couples to the first door, and
a second fixation unit placed at a second distance other than the first distance from the point of rotation, to selectively fix the second door rotated open at a second angle different from the first angle by selectively holding the second holder coupled to the second door while the fixation unit couples to the body, the first fixation unit is selectively fixing the first door open at the first angle and the second holder couples to the second door.

14. The refrigerator of claim 13, wherein, the fixation unit further includes:
a bonding unit coupleable to and detachable from a portion of the body, to thereby couple the fixation unit to the body, and
a fixation plate protruding from the bonding unit and from a front surface of the body, to provide the first fixation unit and the second fixation unit on the fixation plate to selectively hold the first holder coupled to the first door and the second holder coupled to the second door.

15. The refrigerator of claim 14, wherein,
the first fixation unit and the second fixation unit are formed by a steel plate,
a first magnet is provided to be moved in upward and downward directions in the first holder, to allow the first fixation unit to selectively hold the first holder, and
a second magnet is provided to be moved in upward and downward directions in the second holder, to allow the second fixation unit to selectively hold the second holder.

16. The refrigerator of claim 15, wherein,
when the first door is opened, and when the first holder is moved so that the first magnet is placed in a location corresponding to the first fixation unit, the first magnet is configured to be moved upward by magnetic force interacting with the first fixation unit so that the first fixation unit holds the first holder with the first magnet moved upward, thereby fixing the first door.

17. The refrigerator of claim 16, wherein,
when the first magnet is away from the location corresponding to the first fixation unit, the first magnet is moved downward to allow the first door to be easily rotated.

18. The refrigerator of claim 15, wherein,
when the second door is opened, and when the second holder is moved so that the second magnet is placed in a location corresponding to the second fixation unit, the second magnet is configured to be moved upward by magnetic force interacting with the second fixation unit so that the second fixation unit holds the second holder with the second magnet moved upward, thereby selectively fixing the second door.

19. The refrigerator of claim 18, wherein,
when the second magnet is away from the location corresponding to the second fixation unit, the second magnet is moved downward to allow the second door to be easily rotated.

\* \* \* \* \*